(12) United States Patent
Nemtsov et al.

(10) Patent No.: US 12,719,918 B2
(45) Date of Patent: Aug. 25, 2026

(54) MULTI-ARCHITECTURE CYBERSECURITY SENSOR FOR CYBERSECURITY RISK DETECTION BASED ON RUN-TIME DETECTED DATA

(71) Applicant: Wiz, Inc., New York, NY (US)

(72) Inventors: Arik Nemtsov, Kfar Saba (IL); Eliad Peller, Gimzo (IL); Yonatan Doron, Herzeliya (IL); Gal De Leon, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 18/756,927

(22) Filed: Jun. 27, 2024

(65) Prior Publication Data

US 2026/0006064 A1 Jan. 1, 2026

(51) Int. Cl.
*H04L 9/00* (2022.01)
*H04L 9/40* (2022.01)

(52) U.S. Cl.
CPC ...... *H04L 63/1441* (2013.01); *H04L 63/1416* (2013.01)

(58) Field of Classification Search
CPC ........................ H04L 63/1441; H04L 63/1416
USPC ........................................................... 726/23
See application file for complete search history.

(56) References Cited

U.S. PATENT DOCUMENTS 9,582,662 B1 2/2017 Messick et al.
10,540,499 B2 1/2020 Wailly et al.
11,005,860 B1 5/2021 Glyer et al.
11,245,730 B2 2/2022 Bailey
11,496,498 B2 11/2022 Wright et al.
11,507,672 B1 * 11/2022 Pagnozzi ................ G06F 21/54
11,546,360 B2 1/2023 Woodford et al.
11,570,090 B2 1/2023 Shen et al.
11,645,390 B2 * 5/2023 Vijayvargiya ........ G06F 21/566 726/23
2012/0054550 A1 * 3/2012 Albrecht ............... G06F 11/362 714/E11.21
2013/0124669 A1 5/2013 Anderson et al.
2016/0292061 A1 * 10/2016 Marron ................. G06F 11/362
2018/0063290 A1 3/2018 Yang et al.
2019/0207966 A1 7/2019 Vashisht et al.
2020/0311766 A1 * 10/2020 Shiravi Khozani ..... G06F 21/53
2020/0320845 A1 10/2020 Livny et al.
2021/0208997 A1 * 7/2021 Immonen ................ G06F 21/71
2021/0312037 A1 * 10/2021 Revivo ................. G06F 21/577
2022/0086173 A1 3/2022 Yavo et al.

(Continued)

FOREIGN PATENT DOCUMENTS

EP 4160983 A1 4/2023

*Primary Examiner* — Christopher J Brown
(74) *Attorney, Agent, or Firm* — M&B IP Analysts, LLC

(57) ABSTRACT

A system and method for deploying a multi-architecture sensor for cybersecurity object detection is presented. The method includes: deploying a monitoring debugger on a hardware abstraction layer of a virtual instance, the virtual instance deployed in a computing environment; deploying a sensor application communicating with the monitoring debugger, the sensor application configured to detect events in the virtual instance; detecting an event based on data detected by the sensor application; determining that the detected event corresponds to a cybersecurity issue; and initiating a remediation action based on the cybersecurity issue.

21 Claims, 8 Drawing Sheets

(56) References Cited

U.S. PATENT DOCUMENTS

2022/0215101 A1* 7/2022 Rioux .................. G06F 21/577
2023/0385413 A1* 11/2023 Patil ..................... G06F 21/566

* cited by examiner

MULTI-ARCHITECTURE CYBERSECURITY SENSOR FOR CYBERSECURITY RISK DETECTION BASED ON RUN-TIME DETECTED DATA

TECHNICAL FIELD

The present disclosure relates generally to detection of cybersecurity threats, and specifically to complementary solutions for security threat detecting utilizing a multi-architecture sensor.

BACKGROUND

Cybersecurity threats come in many shapes and forms, such as malware, worms, crypto miners, man-in-the-middle attacks, code injection, misconfigurations, and so on. Different threats pose different risks, and can often be detected in different ways. As such, there are many solutions which detect different types of cybersecurity threats, each with advantages and disadvantages. Cloud computing platforms, such as provided by Amazon® Web Services (AWS), Google® Cloud Platform (GCP), Microsoft® Azure, and the like, are high value targets for attackers, and therefore their vulnerabilities are more likely to become cybersecurity threats. It is therefore extremely useful to detect such cybersecurity threats.

In the realm of cyber security threat detection, sensors play a pivotal role in monitoring and identifying malicious activities within networks and systems. However, the state of the art in sensor technology faces several challenges and issues. One significant concern is the ability of sensors to accurately detect and classify emerging threats in real-time. A cyber threats become increasingly sophisticated and diverse, traditional sensors may struggle to keep pace with rapidly evolving cyberattacks. Additionally, the sheer volume of data generated by modern networks poses a challenge for sensors, as they must sift through vast amounts of information to identify potential threats while avoiding false positives.

Furthermore, ensuring the security and integrity of sensor data is crucial, as compromised sensors could inadvertently provide cyber attackers with misleading information or serve as an entry point for infiltration. Addressing these issues requires ongoing research and innovation in sensor technology, including advancements in machine learning algorithms for anomaly detected, improved data processing capabilities, and enhanced collaboration between industry stakeholders to develop standardized approaches to sensor deployment and integration within cybersecurity frameworks.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term “some embodiments” or “certain embodiments” may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include deploying a monitoring debugger on a hardware abstraction layer of a virtual instance, the virtual instance deployed in a computing environment. Method may also include deploying a sensor application communicating with the monitoring debugger, the sensor application configured to detect events in the virtual instance. Method may furthermore include detecting an event based on data detected by the sensor application. Method may in addition include determining that the detected event corresponds to a cybersecurity issue. Method may moreover include initiating a remediation action based on the cybersecurity issue. Other embodiments of this aspect include corresponding computer systems, apparatus, and computer programs recorded on one or more computer storage devices, each configured to perform the actions of the methods.

Implementations may include one or more of the following features. Method may include: generating an inspectable disk based on an original disk of the virtual instance; detecting a cybersecurity object utilizing a static analysis of the inspectable disk; and determining that the detected event corresponds to the cybersecurity issue further based on detecting the cybersecurity object. Method may include: initiating the remediation action based on the cybersecurity object. Method may include: configuring the monitoring debugger to detect events on an eBPF protocol; and configuring the monitoring debugger to transmit detected events to the sensor application. Method may include: configuring the monitoring debugger to detect events utilizing pTrace; and configuring the monitoring debugger to transmit detected events to the sensor application. Method may include: configuring the monitoring debugger to detect application events in the virtual instance; and configuring the monitoring debugger to transmit detected events to the sensor application. Method may include: configuring the monitoring debugger to stop execution of the sensor application; and configuring a new sensor application to communicate with the monitoring debugger in response to determining that the sensor application has stopped execution. Method may include: configuring the monitoring debugger to stop execution of the sensor application, where the sensor application is deployed through the monitoring debugger. Method may include: sending a rule to the sensor application, the rule including a logical expression and an action; configuring the sensor application to apply the rule on a detected event; and configuring the sensor application to perform the action in response to applying the rule on the event and receiving a predetermined result. Implementations of the described techniques may include hardware, a method or process, or a computer tangible medium.

In one general aspect, non-transitory computer-readable medium may include one or more instructions that, when executed by one or more processors of a device, cause the device to: deploy a monitoring debugger on a hardware abstraction layer of a virtual instance, the virtual instance deployed in a computing environment; deploy a sensor application communicating with the monitoring debugger, the sensor application configured to detect events in the virtual instance; detect an event based on data detected by the sensor application; determine that the detected event corresponds to a cybersecurity issue; and initiate a remediation action based on the cybersecurity issue. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: deploy a monitoring debugger on a hardware abstraction layer of a virtual instance, the virtual instance deployed in a computing environment. System may in addition deploy a sensor application communicating with the monitoring debugger, the sensor application configured to detect events in the virtual instance. System may moreover detect an event based on data detected by the sensor application. System may also determine that the detected event corresponds to a cybersecurity issue. System may furthermore initiate a remediation action based on the cybersecurity issue. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: generate an inspectable disk based on an original disk of the virtual instance; detect a cybersecurity object utilizing a static analysis of the inspectable disk; and determine that the detected event corresponds to the cybersecurity issue further based on detecting the cybersecurity object. System where the memory contains further instructions which when executed by the processing circuitry further configure the system to: initiate the remediation action based on the cybersecurity object. System where the memory contains further instructions which when executed by the processing circuitry further configure the system to: configure the monitoring debugger to detect events on an eBPF protocol; and configure the monitoring debugger to transmit detected events to the sensor application. System where the memory contains further instructions which when executed by the processing circuitry further configure the system to: configure the monitoring debugger to detect events utilizing pTrace; and configure the monitoring debugger to transmit detected events to the sensor application. System where the memory contains further instructions which when executed by the processing circuitry further configure the system to: configure the monitoring debugger to detect application events in the virtual instance; and configure the monitoring debugger to transmit detected events to the sensor application. System where the memory contains further instructions which when executed by the processing circuitry further configure the system to: configure the monitoring debugger to stop execution of the sensor application; and configure a new sensor application to communicate with the monitoring debugger in response to determining that the sensor application has stopped execution. System where the memory contains further instructions which when executed by the processing circuitry further configure the system to: configure the monitoring debugger to stop execution of the sensor application, where the sensor application is deployed through the monitoring debugger. System where the memory contains further instructions which when executed by the processing circuitry further configure the system to: send a rule to the sensor application, the rule including a logical expression and an action; configure the sensor application to apply the rule on a detected event; and configure the sensor application to perform the action in response to applying the rule on the event and receiving a predetermined result. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
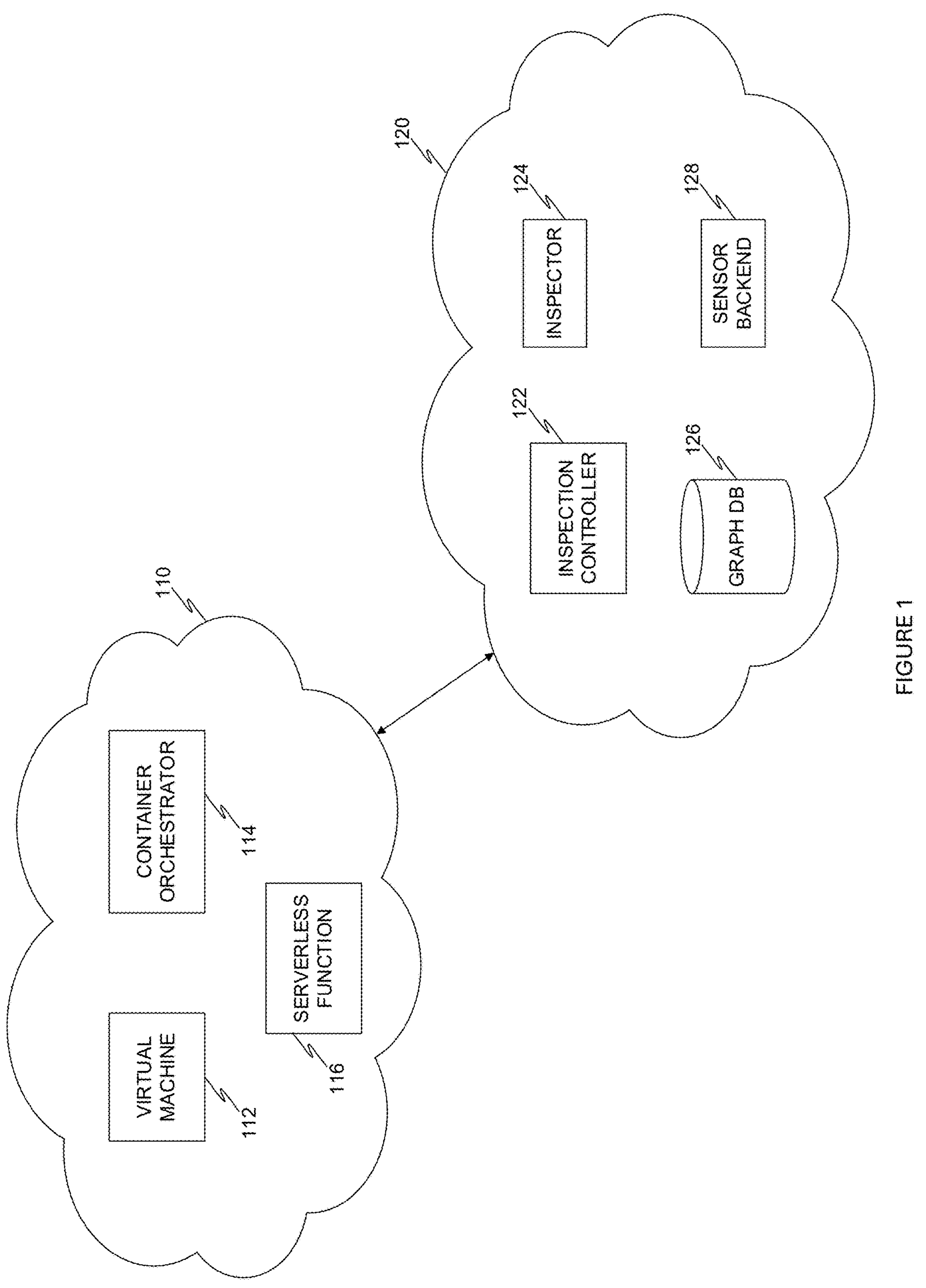
FIG. 1 is a schematic diagram of a cloud computing environment monitored for a cybersecurity threat by an inspection environment, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for a multi-architecture cybersecurity sensor for cybersecurity risk detection. In an embodiment, a multi-architecture sensor application includes a plurality of software components. In some embodiments, a first software component is a debugger application, and a second software component is a sensor application. This allows the debugger application, which is configured to detect events on a virtual instance, to be persistent, while the sensor application itself is configurable and can be updated from time to time, according to an embodiment.

FIG. 1 is an example schematic diagram of a cloud computing environment monitored for a cybersecurity threat by an inspection environment, implemented in accordance with an embodiment. In an embodiment, a cloud computing environment 110 is implemented as a virtual private cloud (VPC), Virtual Network (VNet), and the like, over a cloud computing platform. A cloud computing platform may be provided, for example, by Amazon® Web Services (AWS), Google® Cloud Platform (GCP), Microsoft® Azure, and the like. A cloud computing environment 110 includes cloud entities deployed therein. A cloud entity may be, for example, a principal, a resource, a combination thereof, and the like. In an embodiment, a resource is a cloud entity which provides access to a compute resource, such as a processor, a memory, a storage, and the like. In some embodiments a resource is a virtual machine, a software container, a serverless function, and the like. A resource may be, or may include, a software application deployed thereon, such as a webserver, a gateway, a load balancer, a web application firewall (WAF), an appliance, and the like.

In certain embodiments, a principal is a cloud entity which is authorized to initiate actions in the cloud computing environment. A cloud entity may be, for example, a user account, a service account, a role, and the like. In some embodiments, a cloud entity is a principal relative to another cloud entity, and a resource to other cloud entities. For example, a load balancer is a resource to a user account requesting a webpage from a webserver behind the load balancer, and the load balancer is a principal to the webserver.

The cloud computing environment 110 includes a plurality of resources, such as virtual machine 112, software container orchestrator 114, and serverless function 116. A virtual machine 112 may be deployed, for example, utilizing Oracle® VirtualBox®. A software container orchestrator 114 may be deployed, for example, utilizing a Docker® engine, a Kubernetes® engine, and the like. In an embodiment, a software container orchestrator 114 is configured to deploy a software cluster, each cluster including a plurality of nodes. In an embodiment, a node includes a plurality of pods. A serverless function 116, may be, for example, utilized with Amazon® Lambda. In an embodiment, the serverless function 116 is a serverless function container image.

Each such resource is susceptible to various cybersecurity threats. Such threats can become apparent for example due to a software version of an application in a software container 114, an operating system (OS) version of a virtual machine 112, a misconfiguration in code of a serverless function 116, and the like. The cloud computing environment 110 is monitored for cybersecurity threats by an inspection environment 120. In an embodiment, the inspection environment is implemented as a cloud computing environment, such as a VPC, VNet, and the like.

In an embodiment, each of the virtual machine 112, the software container 114, and the serverless function 116 include a sensor configured to a particular resource, resource type, combination thereof, and the like. An example deployment of a sensor is discussed in more detail in FIG. 2 below.

In an embodiment, the sensor (not shown in FIG. 1) is configured to listen for events, packets, and the like, on a data link layer. For example, the sensor is configured to utilize an eBPF interface, which allows non-intrusive monitoring of the data link layer communication. In certain embodiments, the sensor is further configured to send data to and receive data from a sensor backend server 128. The sensor backend server 128 is a workload, such as a virtual machine, software container, serverless function, combination thereof, and the like, which is deployed in the inspection environment 120.

In an embodiment, the sensor backend server 128 is configured to receive sensor generated data. For example, the sensor backend server 128 is configured, in an embodiment, to receive events from a sensor. In some embodiments, the sensor is configured to request from the sensor backend server 128 rules, definitions, and the like, which the sensor is configured to apply to events, for example as detected on an eBPF interface. For example, a predetermined event, such as indicating access to an IP address, IP address range, and the like, may be checked against a definition. A definition is a logical expression which, when applied to an event, yields a "true" or "false" result. In an embodiment, a rule is a logical expression which includes an action. For example, a rule may be that if a certain definition is true when applied to an event, data pertaining to the event should be sent to the sensor backend server 128.

In some embodiments, the sensor backend server 128 is configured to initiate inspection of a resource deployed in the cloud computing environment 110. For example, the sensor backend server 128 may be configured to initiate such inspection in response to receiving an event, data, a combination thereof, and the like, from a sensor deployed on a resource. In an embodiment, initiating inspection of a resource is performed by generating an instruction for an inspection controller 122, the instruction, when executed, configures an inspector 124 to inspect the resource.

For example, a sensor is configured to send event data to the sensor backend server 128 in response to detecting that a definition, applied by the sensor to a detected event, results in a "true" value when applied. As an example, the definition may be "is the IP address in the range of 127.0.0.1 through 127.0.0.99", which in this example correspond to an IP address range used by a malware, such as a crypto miner. When the definition is applied, for example to a detected network packet, and the result is "true", the sensor is configured to send data pertaining to the event to the sensor backend server 128. Data pertaining to the event may be, for example, an IP address, an event type, combinations thereof, and the like.

In an embodiment, the sensor backend server 128 is configured to receive the data. In some embodiments, the sensor backend server 128 is further configured to apply a rule to the received data to determine if an inspection of the workload on which the sensor is deployed should be inspected for a cybersecurity threat. For example, the sensor backend server 128 is configured to generate an instruction to inspect a virtual machine 112, in response to receiving an indication from a sensor deployed as service on the virtual machine that a communication has been detected between the virtual machine 112 and a server having an IP address which is a forbidden IP address, such as an IP address associated with a malware.

For example, the sensor backend server 128 may generate an instruction for the inspection controller 122, which when executed by the inspection controller generates a an inspectable disk, for example utilizing a snapshot, a copy, a clone, and the like of a disk (not shown) associated with the virtual machine 112, and provides access to an inspector 124 to the inspectable disk. In an embodiment the inspector 124 is configured to detect a cybersecurity threat. For example, the inspector 124 is configured to receive, in an embodiment, a hash of an application stored on the inspectable disk, and determine if the hash matches a hash of known malware applications. In certain embodiments, the inspector 124 is provided with a persistent volume claim (PVC) to the inspectable disk.

In some embodiments, the sensor is configured to generate a hash of an application on the resource, such as the virtual machine 112, on which it is deployed, and send the hash to the sensor backend server 128. The received hash may then be compared, for example by providing it to the inspector 124, with known hash values which correspond to malware applications.

While the examples above discuss malware and crypto miners, it is readily apparent that the sensor and inspector 124 may be utilized to detect other types of cybersecurity threats, such as an exposure, a vulnerability, a weak password, an exposed password, a misconfiguration, and the like.

In certain embodiments, the inspection environment 120 further includes a graph database 126, on which a security is stored. In an embodiment, the security graph is configured to store a representation of a cloud computing environment, such as cloud computing environment 110. For example, the representation may be based on a predefined unified data schema, so that each different cloud platform may be represented using a unified data schema, allowing for a unified representation. For example, a principal may be represented by a predefined data structure, each principal represented by a node in the security graph. Likewise, a resource may be represented by another predefined data structure, each resource represented by a node in the security graph.

In certain embodiments, data received from a sensor deployed on a resource in the cloud computing environment may be stored in the graph database as part of the security graph. In the example above, in response to receiving data from the sensor which indicates a potential malware infection of the virtual machine 112, the sensor backend server 128 is configured, in an embodiment, to: generate a node representing the malware in the security graph, generate a node in the security graph representing the virtual machine 112, and connect the node representing the malware with the node representing the virtual machine 112.

Figure 2:
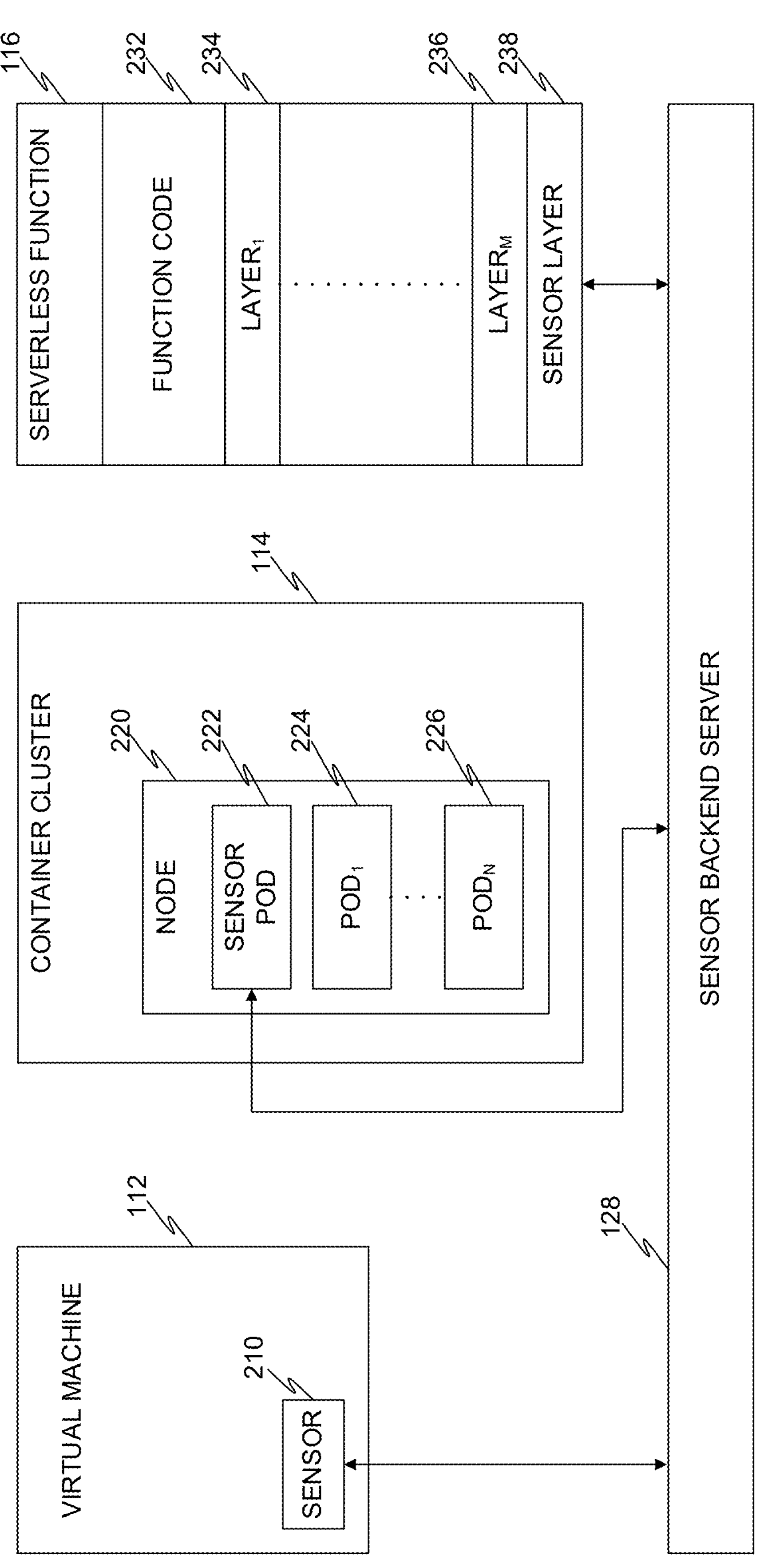
FIG. 2 is a schematic illustration of a sensor backend server communicating with a plurality of sensors deployed on various workloads, in accordance with an embodiment.

FIG. 2 is an example schematic illustration of a sensor backend server communicating with a plurality of sensors deployed on various workloads, implemented in accordance with an embodiment. In some embodiments, a sensor backend server 128 is configured to communicate with a machine (not shown) having a sensor installed thereon and communicatively coupled with the sensor backend server 128. In an embodiment, the machine is bare metal machine, a computer device, a networked computer device, a laptop, a tablet, and the like computing devices.

In an embodiment, a sensor backend server 128 is implemented as a virtual machine, a software container, a serverless function, a combination thereof, and the like. In certain embodiments, a plurality of sensor backend servers 128 may be implemented. In some embodiments where a plurality of sensor backend servers 128 are utilized, a first group of sensor backend servers of the plurality of sensor backend servers is configured to communicate with a sensor deployed on a first type of resource (e.g., virtual machine), a second group of sensor backend servers is configured to communicate with resources of a second type, etc. In an embodiment, a first group of sensor backend servers is configured to communicate with sensors deployed on resources in a first cloud computing environment deployed on a first cloud platform (e.g., AWS) and a second group of sensor backend servers is configured to communicate with sensors deployed on resources in a second cloud computing environment deployed on a second cloud platform (e.g., GCP).

A virtual machine 112 includes a sensor 210. In an embodiment, the sensor 210 is deployed as a service executed on the virtual machine 112. In some embodiments, a virtual machine 112 is configured to request binary code, a software package, and the like, for example from a sensor backend sever 128, which when executed by the virtual machine 112 cause a sensor 210 to run as a service on the virtual machine 112. The sensor 210 is configured to listen to a data link layer communication, for example through an eBPF interface.

A container cluster 114 runs a daemonset, and includes a plurality of nodes, such as node 220. The daemonset ensures that each node 220 runs a daemonset pod 222, which is configured as a sensor. For example, a Kubernetes® cluster may execute a daemonset configured to deploy a daemonset pod on each deployed node, wherein the daemonset pod is configured to listen to a data link layer communication, for example through an eBPF interface, to communication of a plurality of pods, such as pod-1 224 through pod-N 226, where 'N' is an integer having a value of '1' or greater. The daemonset pod 222 is configured, in an embodiment, to communicate with the sensor backend server 128.

A serverless function 116 includes, in an embodiment, a function code 232, and a plurality of code layers 1 through M (labeled respectively as 234 through 236), where 'M' is an integer having a value of '1' or greater. For example, in AWS Lambda a layer contains, in an embodiment, code, content, a combination thereof, and the like. In some embodiments, a layer, such as layer 234 includes runtime data, configuration data, software libraries, and the like.

In certain embodiments, the serverless function 116 includes a sensor layer 238. The sensor layer 238 is configured, in an embodiment, to listen to a data link layer communication of the serverless function 116, for example through an eBPF interface.

The sensor service 210, daemonset pod 222, and sensor layer 238 are each an implementation of a sensor, according to an embodiment. In an embodiment, a sensor is configured to communicate with a sensor backend server 128 through a transport layer protocol, such as TCP. For example, the sensor backend server 128 is configured, in an embodiment, to listen to a predetermined port using a TCP protocol, and a sensor, such as sensor 210, daemonset pod 222, and sensor layer 238 are each configured to communicate with the backend sensor server 128, for example by initiating communication using TCP over the predetermined port.

Figure 3:
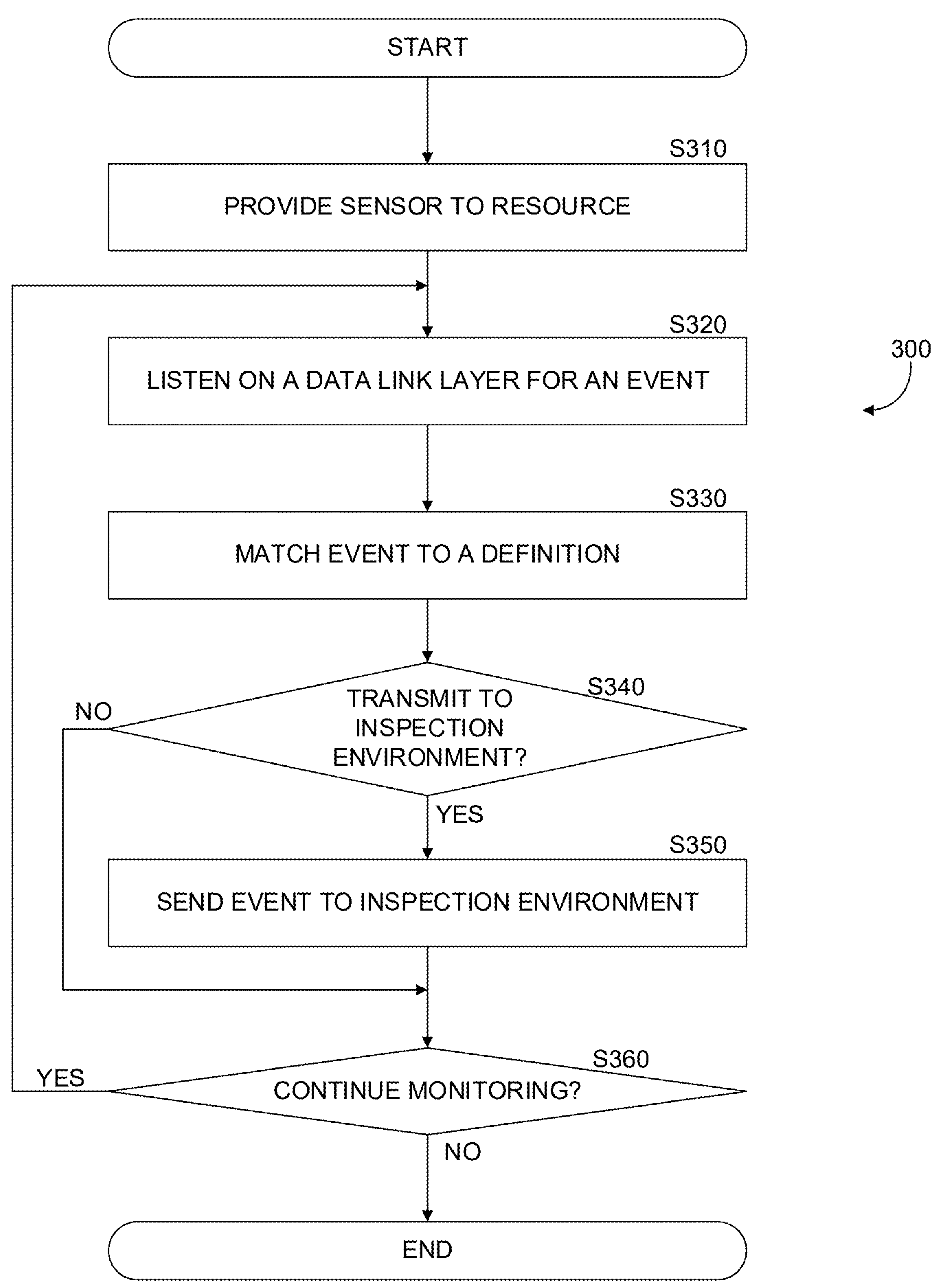
FIG. 3 is a flowchart of a method for performing cybersecurity threat detection on a resource in a cloud computing environment, in accordance with an embodiment.

FIG. 3 is an example flowchart 300 of a method for performing cybersecurity threat detection on a resource in a cloud computing environment, implemented in accordance with an embodiment.

At S310, a resource is provided with a sensor software. In an embodiment, the resource is any one of a virtual machine, a software container, a serverless function, and the like. In certain embodiments, the sensor software is provided based on the resource type. For example, a virtual machine is provided with a software package, such as an executable code, for example a binary code. A software container engine is provided with a daemonset, so that, in an embodiment where a node is deployed in a cluster of the software container engine, the node includes a daemonset pod which is configured to provide the functionality of a sensor, for example such as detailed above. In an embodiment, a serverless function is provided with a sensor layer by providing a code for example in a .ZIP file.

In an embodiment, providing a sensor includes configuring a resource, such as a virtual machine, software container, serverless function, and the like, to receive software which, when executed, configures the resource to deploy a sensor thereon.

At S320, an event is detected from a data link layer communication. In an embodiment, the data link layer is monitored through an eBPF interface for events. In certain embodiments, a software bill of materials (SBOM) is generated. An SBOM may be implemented as a text file, which is based off of events which were detected, for example through the eBPF interface. In an embodiment, an SBOM includes an identifier of a library which is accessed in runtime, an identifier of a binary which is accessed in runtime, an image of which an instance is deployed in runtime, a port which is accessed by a runtime program, a cryptographic hash function value (such as an SHA1, SHA2, and the like values), and the like. For example, an SBOM may include:

```
programs {
  exe_name: "/usr/sbin/rpc.mountd"
  last_seen: 1663138800
  exe_size: 133664
  exe_sha1: "200f06c12975399a4d7a32e171caabfb994f78b9"
  modules {
    path: "/usr/lib/libresolv-2.32.so"
    last_seen: 1663138800
  }
  modules {
    path: "/usr/lib/libpthread-2.32.so"
    last_seen: 1663138800
  }
  modules {
    path: "/usr/lib/ld-2.32.so"
    last_seen: 1663138800
  }
  modules {
    path: "/usr/lib/libc-2.32.so"
    last_seen: 1663138800
  }
  modules {
    path: "/usr/lib/libtirpc.so.3.0.0"
    last_seen: 1663138800
  }
  modules {
    path: "/usr/lib/libnss_files-2.32.so"
    last_seen: 1663138800
  }
  modules {
    path: "/usr/sbin/rpc.mountd"
    last_seen: 1663138800
  }
  listening_sockets {
    ip_addr: "0.0.0.0"
    port: 60311
  }
  listening_sockets {
    ip_addr: "0.0.0.0"
    port: 43639
  }
```

This portion of an SBOM indicates that a remote procedure call (RPC) is executed, which is configured to receive a client request to mount a file system.

At S330, the event is matched to a definition. In some embodiments, a definition includes a logical expression, which when applied to an event results in a "true" or "false" value. For example, a definition may state "software library xyz is accessed", with a result being either true or false, when applied to an event. In some embodiments, a rule is applied to an event. In an embodiment, a rule is a logical expression which further includes an action. For example, a rule states, in an embodiment, "IF software library xyz is accessed by UNKNOWN SOFTWARE, generate an alert". In this example, where an event is detected in which a software having an unknown identifier, for example which does not match a list of preapproved identifiers, attempts to access software library xyz, an alert is generated to indicate that such access is performed.

At S340, a check is performed to determine if data should be transmitted to an inspection environment. In some embodiments, the check is performed by applying a rule to an event, and determining transmission based on an output of applying the rule. If 'yes', execution continues at S350, if 'no' execution continues at S360.

At S350, data respective of an event is transmitted to an inspection environment. In an embodiment, the data is based on an SBOM file. In some embodiments, the data includes event data, such as an identifier of a resource (e.g., virtual machine, software container, serverless function, etc.), an identifier of an application, a hash value, a uniform resource locator (URL) request, a software library identifier, a software binary file identifier, a timestamp, and the like.

At S360, a check is performed to determine if monitoring of the resource should continue. For example, a daemonset of a container may be configured to periodically deploy a daemonset pod to monitor pods in a node. As another example, a virtual machine may be configured to periodically deploy a sensor service which runs as a process on the virtual machine, terminate the process after a predetermined period of time, terminate the process after a predetermined number of detected events, and the like. In some embodiments, the check is performed based on a predetermined amount of elapsed time (e.g., every four hours, every day, twice a day, etc.). If 'yes', execution continues at S320. If 'no', in an embodiment execution terminates. In some embodiments, if 'no', another check is performed at S360, for example after a predetermined period of time has lapsed.

Figure 4:
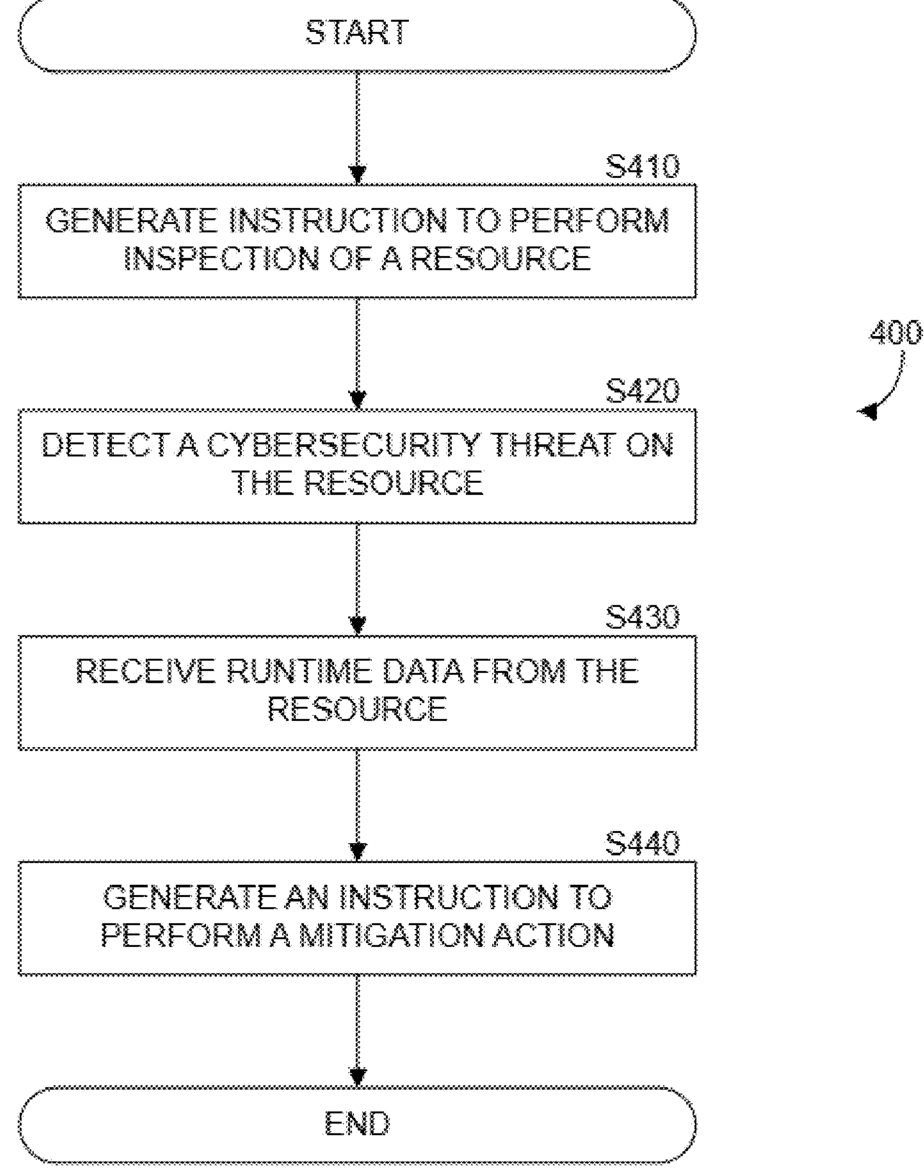
FIG. 4 is a flowchart of a method for mitigating a cybersecurity threat, in accordance with an embodiment.

FIG. 4 is an example flowchart 400 of a method for mitigating a cybersecurity threat, implemented in accordance with an embodiment.

At S410, an instruction to perform inspection is generated. In an embodiment, inspection is performed on a resource, which may be, for example, a virtual machine, a software container, a serverless function, and the like. In an embodiment, the instruction, when executed, generates an inspectable disk based on a disk of a resource. For example, in an embodiment an inspectable disk is generated by performing a snapshot, a clone, a copy, a duplicate, and the like, of a disk attached to a virtual machine. The inspectable disk is accessible by an inspector. In an embodiment, the inspector utilizes static analysis techniques, for example to detect cybersecurity objects, such as a password, a certificate, an application binary, a software library, a hash, and the like.

The detected cybersecurity objects, cybersecurity threats, and the like, are represented, in an embodiment, in a security graph. For example, a node is generated in an embodiment to represent a malware object. The node representing the malware object is connected to a node representing the resource on which an inspector detected the malware object, to indicate that the malware object is present on the resource.

At S420, a cybersecurity threat is detected. In an embodiment, a cybersecurity threat is detected in response to detecting a cybersecurity object on a disk. In certain embodiments, a cybersecurity threat is an exposure, a vulnerability, a misconfiguration, a malware code object, a hash, a combination thereof, and the like. In some embodiments, a hash, which is detected or generated, is compared to another hash of a list of hashes which indicate know cybersecurity threats. For example, malware code objects are often detected by generating hashes of code objects and comparing them to hashes stored in a database of known hashes which are associated with malicious software. In certain embodiments, the cybersecurity threat is a potential cybersecurity threat. In an embodiment, runtime data is utilized to determine if the potential cybersecurity threat is an actual cybersecurity threat.

At S430, runtime data is received. In an embodiment, the runtime data is received from the inspected resource. In certain embodiments, runtime data is received based on cybersecurity objects detected by static analysis methods performed on the resource. For example, an inspector accessing an inspectable disk which is generated based on a disk of a virtual machine deployed in a cloud computing environment detects application libraries, which are cybersecurity objects. In an embodiment a definition is generated based on the detected cybersecurity objects. For example, a cybersecurity object may be a binary of application "xyz". A definition is generated based on the detected cybersecurity object, for example "Application xyz is deployed in runtime". In an embodiment, a rule is generated, for example based on the definition, further stating "IF application xyz is deployed in runtime, THEN perform mitigation action".

At S440, an instruction to perform a mitigation action is generated. In an embodiment, the instruction, when executed, initiates a mitigation action in the cloud computing environment in which the resource is deployed. In some embodiments, the mitigation action is generated based on the detected cybersecurity threat and the received runtime data. In certain embodiments, the mitigation action includes generating an alert, assigning a severity score to an alert (e.g., low, moderate, severe, critical), modifying a severity score of an alert, and the like.

While static analysis techniques can detect such cybersecurity objects and threats, runtime data is required to determine if the cybersecurity objects and threats are actually present in runtime. For example, a database having a misconfiguration, such as no password protection, is considered a cybersecurity threat. Typically, an alert is generated in response to detecting such a cybersecurity threat, and a mitigation action is initiated. However, in cloud computing production environments many such alerts are generated, and therefore it is desirable to prioritize alerts based, for example, on a severity of an event. In this example, if a process for managing the database is not present at runtime, then the severity of the cybersecurity threat is actually lower than if the database software was running, and therefore presented an actual cybersecurity threat. It is therefore beneficial to combine static analysis data with runtime data in an efficient manner in order to prioritize responses, such as mitigation actions, to detected cybersecurity threats. This allows to better utilize the compute resources of a cloud computing environment, and improving response time to cybersecurity threats based on actual severity.

Figure 5:
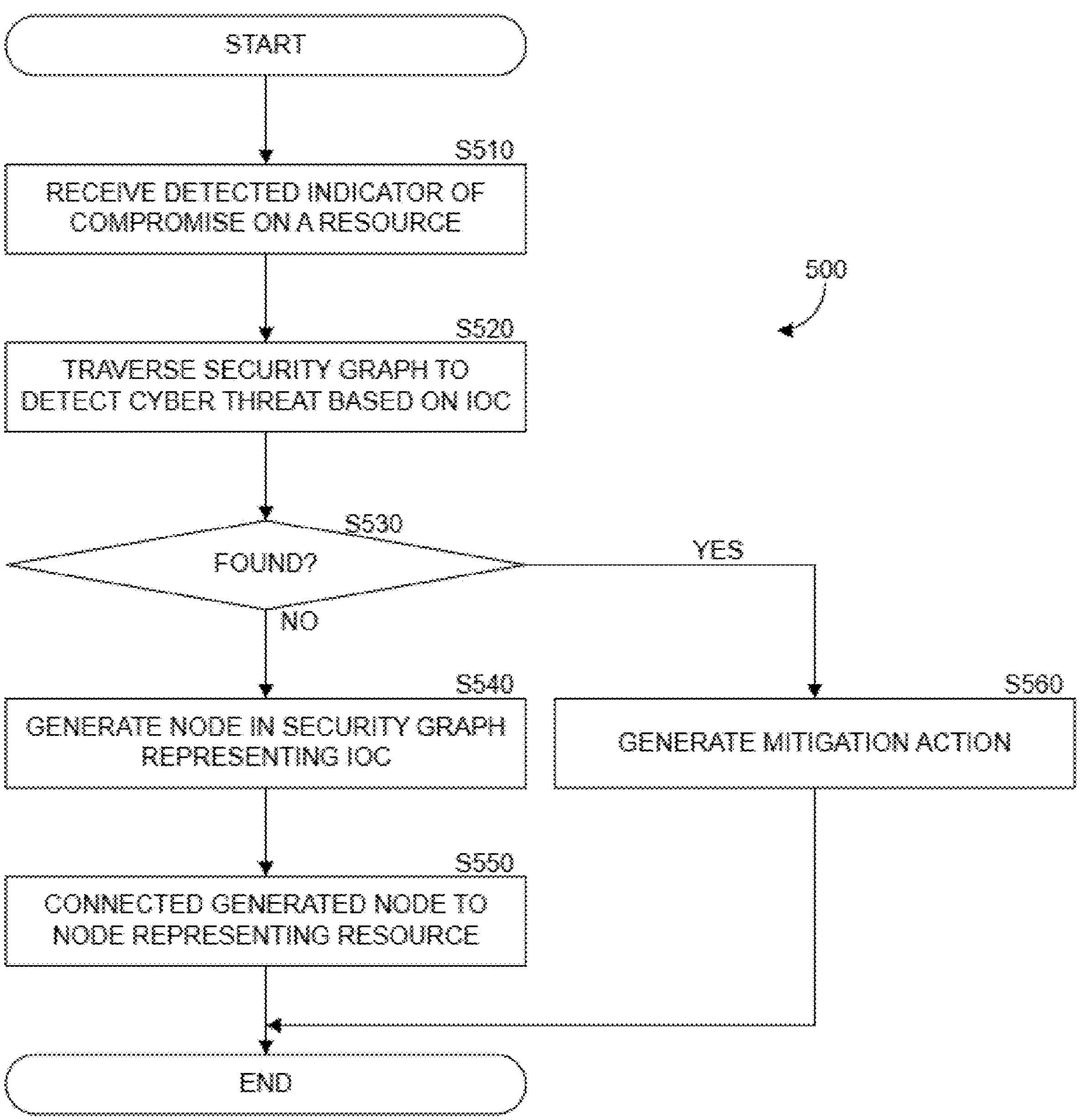
FIG. 5 is a flowchart of a method for utilizing a security graph in detecting a cybersecurity threat based on an indicator of compromise, implemented in accordance with an embodiment.

FIG. 5 is an example flowchart 500 of a method for utilizing a security graph in detecting a cybersecurity threat based on an indicator of compromise, implemented in accordance with an embodiment.

At S510, an indicator of compromise (IOC) is received. In an embodiment, the IOC is received from a sensor, the sensor configured to detect an IOC. In certain embodiments, an IOC is data, such as network traffic data, login data, access data, a data request, and the like. For example, IOC data indicates, in an embodiment, unusual network traffic, unusual login time, unusual logged-in user session time, a high volume of requests for data, network traffic to restricted domains, network traffic to suspicious geographical domains, mismatched port-application network traffic (i.e. sending command and control communication as a DNS request over port 80), and the like.

In certain embodiments, an IOC data is generated based on an aggregation of events detected on a resource, for example on a virtual machine. In an embodiment, a sensor is configured to store a plurality of events, and generate aggregated data based on the stored plurality of events. For example, network traffic destinations are stored, in an embodiment, to perform anomaly detection, i.e., to detect network traffic destinations which are anomalous.

At S520, a security graph is traversed to detect a cybersecurity threat. In an embodiment, an instruction is generated which, when executed by a graph database, configures a database management system to execute a query for detecting a node in a security graph stored on the graph database. In certain embodiments, the detected node represents a resource on which a sensor is deployed, the sensor generating the IOC data which is received at S510.

In certain embodiments, a security graph is traversed to detect a node representing a cybersecurity threat corresponding to the IOC and connected to a node representing the resource from which the IOC was generated. For example, a query is generated based on the IOC data and executed on the security graph. In an embodiment, execution of the query returns a result.

At S530, a check is performed to determine if the cybersecurity threat was found. In an embodiment, the check includes receiving a result from a query executed on a security graph, and determining if a node representing a resource is connected to a node representing a cybersecurity threat. If 'yes', execution continues at S560. If 'no' execution continues at S540.

At S540, a node is generated to represent the IOC in the security graph. In an embodiment, IOC data is stored with the node. In certain embodiments, an identifier of an IOC may be assigned to the IOC data, and the identifier of the IOC is stored with the node in the graph database.

At S550, an edge is generated to connect the node representing the IOC to a node representing the resource. In an embodiment the resource is a resource from which the IOC originated. For example, an edge may be generated to connected the node representing the IOC to the node representing the resource.

At S560, a mitigation action is generated. In an embodiment, generating a mitigation action includes generating an instruction which when executed configures a computing device to initiate the mitigation action. In an embodiment, the mitigation is initiating an inspection of the resource, generating alert an alert, a combination thereof, and the like. In certain embodiments the alert is generated based on any one of: the IOC data, an identifier of the resource, a predetermined rule, a combination thereof, and the like. In an embodiment, initiating inspection of a resource includes generating an instruction which when executed in a cloud computing environment configures the cloud computing environment to generate an inspectable disk, and provide an inspector workload access to the inspectable disk to inspect the inspectable disk for a cybersecurity threat corresponding to the IOC data.

Figure 6:
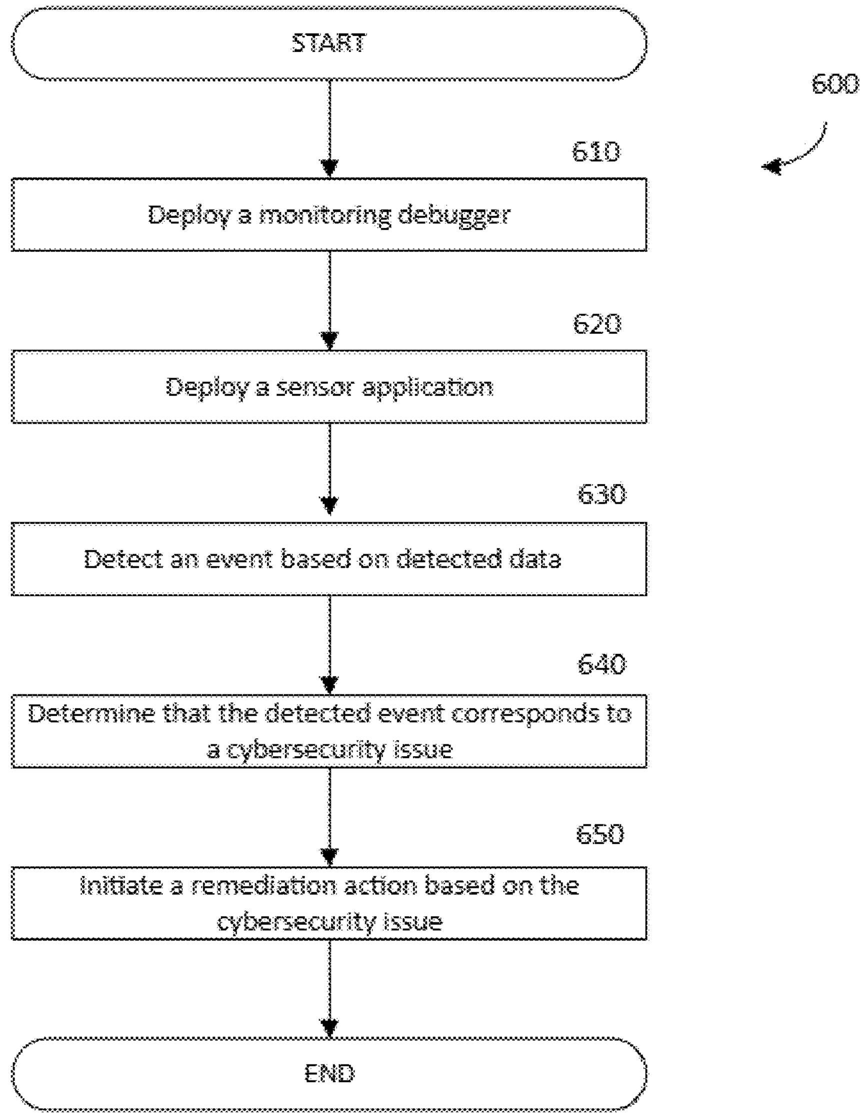
FIG. 6 is a flowchart of a method for deploying a multi-architecture sensor for cybersecurity detection.

FIG. 6 is an example flowchart of a method for deploying a multi-architecture sensor application, implemented in accordance with an embodiment. In an embodiment, a multi-architecture sensor application includes a plurality of software components. In some embodiments, a first software component is a debugger application, and a second software component is a sensor application. This allows the debugger application, which is configured to detect events on a virtual instance, to be persistent, while the sensor application itself is configurable and can be updated from time to time, according to an embodiment.

At S610, a monitoring debugger is deployed. In an embodiment, the monitoring debugger is deployed on a software abstraction layer (SAL). In some embodiments, the SAL is of a virtual instance, such as a virtual machine, a software container, a serverless function, and the like.

In an embodiment, a SAL is an intermediary between the logical components of a computer system and the software that interacts with them. Its primary function is to provide a standardized interface that software applications can use to access underlying resources without needing to understand the specifics of the underlying architecture.

In some embodiments, the SAL is configured to translate generic commands and operations issued by software into low-level instructions executable by components. According to an embodiment, such abstraction enables software applications to be independent, e.g., run on different platforms without requiring modifications to the code.

At S620, a sensor application is deployed. In an embodiment, the sensor application is configured to communicate with the monitoring debugger. In some embodiments, the sensor application is deployed through the monitoring debugger, for example as a controllable software application. In an embodiment, a monitoring debugger is configured to execute a controllable software application step-by-step (e.g., instruction by instruction), stop the controllable software application, pause execution of the controllable software application, a combination thereof, and the like.

In certain embodiments, the sensor application is configured to detect events in the virtual instance, for example by listening on a data link layer. In some embodiments, the sensor is configured to request from a sensor backend server (e.g., as shown in FIG. 1) rules, definitions, and the like, which the sensor is configured to apply to events, for example as detected on an eBPF interface. For example, in an embodiment, a predetermined event type is checked against a definition, such as indicating access to an IP address, IP address range, and the like.

At S630, an event is detected. In an embodiment, the event is detected based on detected data, for example detected by listening on a data link layer. According to an embodiment, the sensor application is configured to detect data from a data link layer, and detect an event based on a predefined event type definition received from a backend server.

At 640, the detected event is determined to correspond to a cybersecurity issue. According to an embodiment, a cybersecurity issue pertains to any issue related to a cybersecurity threat including an exposure, a vulnerability, a misconfiguration, a malware code object, a combination thereof, and the like. In an embodiment, a cybersecurity issue is detected based on a cybersecurity object. For example, in some embodiments, an inspector is configured to inspect an inspectable disk and detect thereon a cybersecurity object, which indicates a cybersecurity issue.

In some embodiments, detecting an event at runtime utilizing a sensor, and referencing the detected event with a cybersecurity object detected using static analysis techniques is beneficial as it allows to have a more complete view than having any one of these solutions on its own.

For example, in an embodiment, a cybersecurity object is detected, such as a software artifact, software library, software binary, etc., which indicates that a software application includes a vulnerability. In certain embodiments, combining that information with runtime data allows visibility to determine if the detected vulnerability is exploited. For example, where the vulnerability is exploited, a runtime service attempts to utilize a network connection to a remote server, and such an attempt is detected as an event by the sensor.

At 650, a remediation action is initiated. In an embodiment, the remediation action is initiated based on the cybersecurity issue. According to some embodiments, a remediation action is initiated prior to an exploitation of a vulnerability occurring. In certain embodiments, a mitigation action is initiated, which is initiated after a vulnerability is exploited. In an embodiment, the remediation action, the mitigating action, and the like, includes initiating an inspection of the resource, generating alert an alert, a combination thereof, and the like. In certain embodiments the alert is generated based on any one of: an identifier of the resource, an identifier of the cybersecurity object, an identifier of the cybersecurity issue, an identifier of a remediation action, an identifier of a mitigation action, a combination thereof, and the like.

Figure 7:
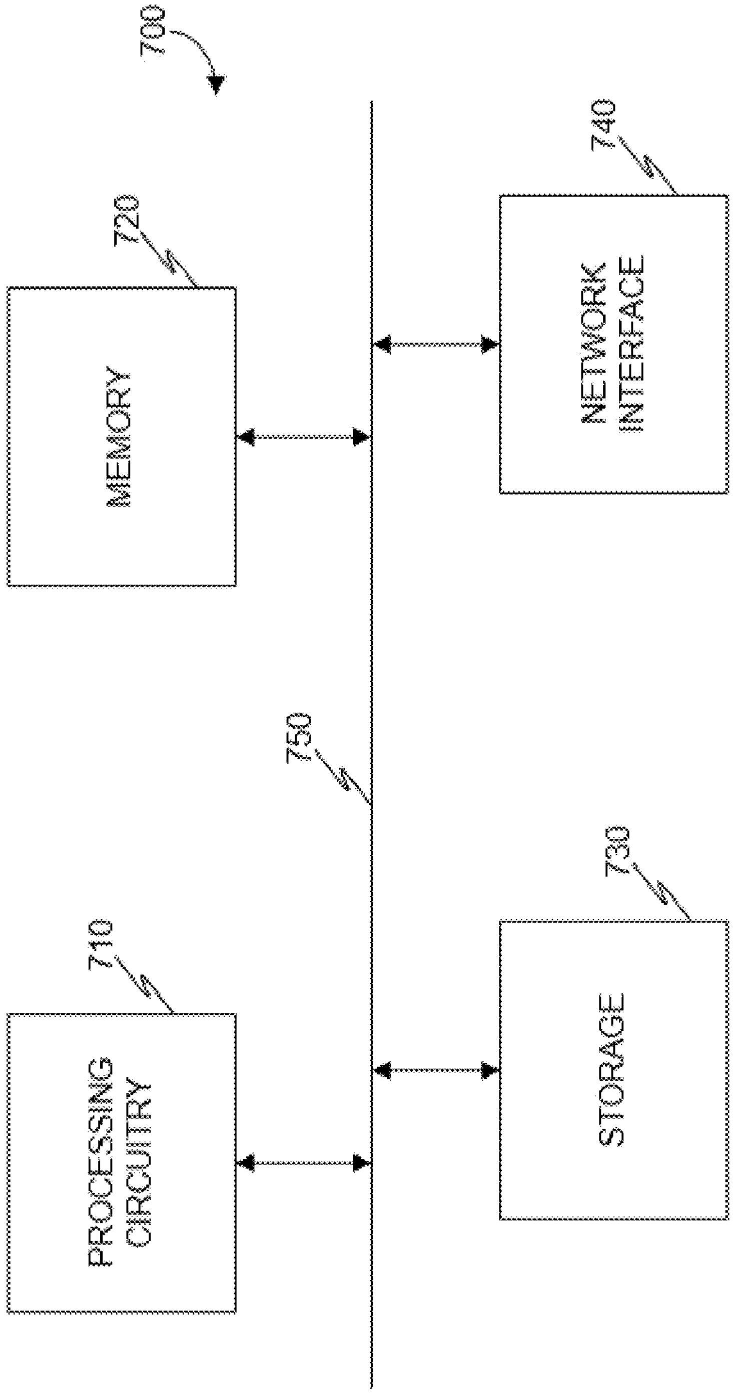
FIG. 7 is a schematic diagram of a sensor backend server according to an embodiment.

FIG. 7 is an example schematic diagram of a sensor backend server 700 according to an embodiment. In an embodiment, the backend sever 128 of FIG. 1 is implemented as the backend server 700. The sensor backend server 700 includes a processing circuitry 710 coupled to a memory 720, a storage 730, and a network interface 740. In an embodiment, the components of the sensor backend server 700 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof.

In one configuration, software for implementing one or more embodiments disclosed herein may be stored in the storage 730. In another configuration, the memory 720 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 740 allows the sensor backend server 128 to communicate with, for example, a sensor 210, a daemonset pod 222, a sensor layer 238, and the like.

It should be understood that the embodiments described herein are not limited to the specific architecture illustrated in FIG. 7, and other architectures may be equally used without departing from the scope of the disclosed embodiments.

Furthermore, in certain embodiments the inspection controller 122, inspector 124, and the like, may be implemented with the architecture illustrated in FIG. 7. In other embodiments, other architectures may be equally used without departing from the scope of the disclosed embodiments.

Figure 8:
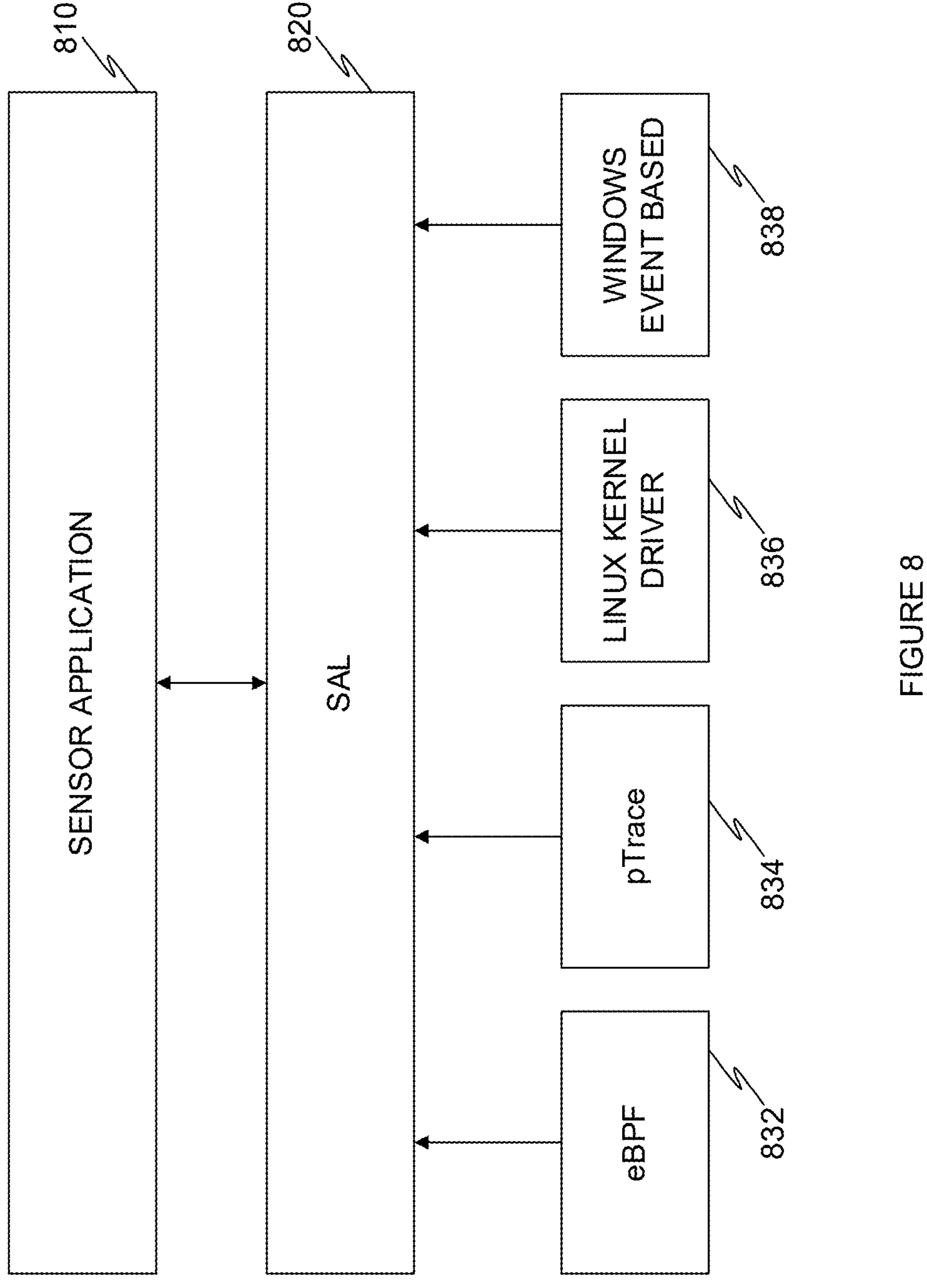
FIG. 8 is a schematic illustration of a multi-architecture sensor deployment, implemented in accordance with an embodiment.

FIG. 8 is an example schematic illustration of a multi-architecture sensor deployment, implemented in accordance with an embodiment. In an embodiment, a sensor application 810 is deployed from a software abstraction layer (SAL) 820. In some embodiments, the SAL 820 includes a monitoring debugger on which the sensor application 810 is deployed. In certain embodiments, the SAL 820, monitoring debugger, etc., is a persistent software, which is continuously executed while the machine is operational, while the sensor application 810 is semi-persistent.

According to an embodiment, a semi-persistent software application is operational other than periods during which the semi-persistent software is updated, rebooted, changed, etc. In some embodiments, a sensor having a split architecture between a persistent portion (i.e., the SAL 820) and a semi-persistent portion (i.e., the sensor application 810) is advantageous as it allows a persistent engine on one hand, while retaining capability to update itself without loss of event monitoring.

For example, in an embodiment, the SAL 820 is configured to receive, detect, listen to, and the like, events from multiple different computing architectures. This allows to deploy and update the same sensor application 810 across multiple different type of computes, virtualizations, and the like, without having to then code a specific interface for each such virtualization.

For example, in an embodiment, the SAL 820 is configured to receive events through an eBPF interface 832, a pTrace interface 834, a Linux® Kernel driver 836, and a Microsoft® Windows® event based interface 838. Thus, the same sensor application 810 can detect events regardless of what type of compute originated the event. When the sensor application 810 requires updating, such can be done without having to also update the SAL 820 component. Therefore, a single update of the sensor application 810 can be applied to each computing instance, such as a virtual machine, a software container, a serverless function, and the like, without having to address each uniquely.

According to an embodiment, a split-architecture for a sensor is advantageous for utilization in a run-time environment of a serverless function, a software container, and like. For example, in an embodiment, such an environment is implemented utilizing AWS Elastic Compute Service (ECS) Fargate, AWS Elast Kubernetes Service (EKS) Fargate, Azure Container Apps (ACA), and the like. In such embodiments, access to eBPF, for example, is either limited or not available, as the software container is controlled by a client, while the machine is controlled by a provider, such as a cloud computing infrastructure provider.

In an embodiment, a sensor application is deployed in a client container, and an entry point override is added to run the sensor application. In some embodiment, the sensor application is added into a container image during build.

In some embodiments, the sensor is deployed on a shared volume. The shared volume is then mounted into a software container. The entry point of the software container is then overridden to the sensor application. This deployment allows the sensor application to be updated periodically, according to an embodiment.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 20; 3A; A and B in combination; B and C in combination; A and C in combination; A, B, and C in combination; 2A and C in combination; A, 3B, and 2C in combination; and the like.

What is claimed is:

1. A method for deploying a multi-architecture sensor for cybersecurity object detection, comprising:

deploying a first monitoring debugger on a hardware abstraction layer of a virtual instance of a first type, the virtual instance of the first type deployed in a computing environment;

deploying a second monitoring debugger on a hardware abstraction layer of a virtual instance of a second type, the virtual instance of the second type deployed in the computing environment;

deploying on the virtual instance of the first type a sensor application communicating with the first monitoring debugger, the sensor application configured to detect events in the virtual instance;

deploying on the virtual instance of the second type the sensor application communicating with the second monitoring debugger;

detecting an event based on data detected by the sensor application;

determining that the detected event corresponds to a cybersecurity issue; and initiating a remediation action based on the cybersecurity issue.

2. The method of claim 1, further comprising:

generating an inspectable disk based on an original disk of the virtual instance;

detecting a cybersecurity object utilizing a static analysis of the inspectable disk; and determining that the detected event corresponds to the cybersecurity issue further based on detecting the cybersecurity object.

3. The method of claim 2, further comprising:

initiating the remediation action based on the cybersecurity object.

4. The method of claim 1, further comprising:

configuring each monitoring debugger to detect events on an eBPF protocol; and configuring each monitoring debugger to transmit detected events to the sensor application.

5. The method of claim 1, further comprising:

configuring each monitoring debugger to detect events utilizing pTrace; and configuring each monitoring debugger to transmit detected events to the sensor application.

6. The method of claim 1, further comprising:

configuring each monitoring debugger to detect application events in the virtual instance; and configuring each monitoring debugger to transmit detected events to the sensor application.

7. The method of claim 1, further comprising:

configuring each monitoring debugger to stop execution of the sensor application; and configuring a new sensor application to communicate with each monitoring debugger in response to determining that the sensor application has stopped execution.

8. The method of claim 7, further comprising:

configuring each monitoring debugger to stop execution of the sensor application, wherein the sensor application is deployed through a monitoring debugger.

9. The method of claim 1, further comprising:

sending a rule to the sensor application, the rule including a logical expression and an action;

configuring the sensor application to apply the rule on a detected event; and configuring the sensor application to perform the action in response to applying the rule on the event and receiving a predetermined result.

10. The method of claim 1, wherein the first monitoring debugger is configured for deployment only on a virtual instance of the first type, and the second monitoring debugger is configured for deployment only on a virtual instance of the second type.

11. The method of claim 1, wherein the data detected by the sensor application is network packets of a data link layer communication.

12. A non-transitory computer-readable medium storing a set of instructions for deploying a multi-architecture sensor for cybersecurity object detection, the set of instructions comprising:

one or more instructions that, when executed by one or more processors of a device, cause the device to:

deploy a first monitoring debugger on a hardware abstraction layer of a virtual instance of a first type, the virtual instance of the first type deployed in a computing environment;

deploy a second monitoring debugger on a hardware abstraction layer of a virtual instance of a second type, the virtual instance of the second type deployed in the computing environment;

deploy on the virtual instance of the first type a sensor application communicating with the first monitoring debugger, the sensor application configured to detect events in the virtual instance;

deploy on the virtual instance of the second type the sensor application communicating with the second monitoring debugger;

detect an event based on data detected by the sensor application;

determine that the detected event corresponds to a cybersecurity issue; and initiate a remediation action based on the cybersecurity issue.

13. A system for deploying a multi-architecture sensor for cybersecurity object detection comprising:

a processing circuitry;

a memory, the memory containing instructions that, when executed by the processing circuitry, configure the system to:

deploy a first monitoring debugger on a hardware abstraction layer of a virtual instance of a first type, the virtual instance of the first type deployed in a computing environment;

deploy a second monitoring debugger on a hardware abstraction layer of a virtual instance of a second type, the virtual instance of the second type deployed in the computing environment;

deploy on the virtual instance of the first type a sensor application communicating with the first monitoring debugger, the sensor application configured to detect events in the virtual instance;

deploy on the virtual instance of the second type the sensor application communicating with the second monitoring debugger;

detect an event based on data detected by the sensor application;

determine that the detected event corresponds to a cybersecurity issue; and initiate a remediation action based on the cybersecurity issue.

14. The system of claim 13, wherein the memory contains further instructions which when executed by the processing circuitry further configure the system to:

generate an inspectable disk based on an original disk of the virtual instance;

detect a cybersecurity object utilizing a static analysis of the inspectable disk; and determine that the detected event corresponds to the cybersecurity issue further based on detecting the cybersecurity object.

15. The system of claim 14, wherein the memory contains further instructions which when executed by the processing circuitry further configure the system to:

initiate the remediation action based on the cybersecurity object.

16. The system of claim 13, wherein the memory contains further instructions which when executed by the processing circuitry further configure the system to:

configure each monitoring debugger to detect events on an eBPF protocol; and configure each monitoring debugger to transmit detected events to the sensor application.

17. The system of claim 13, wherein the memory contains further instructions which when executed by the processing circuitry further configure the system to:

configure each monitoring debugger to detect events utilizing pTrace; and configure each monitoring debugger to transmit detected events to the sensor application.

18. The system of claim 13, wherein the memory contains further instructions which when executed by the processing circuitry further configure the system to:

configure each monitoring debugger to detect application events in the virtual instance; and configure each monitoring debugger to transmit detected events to the sensor application.

19. The system of claim 13, wherein the memory contains further instructions which when executed by the processing circuitry further configure the system to:

configure each monitoring debugger to stop execution of the sensor application; and configure a new sensor application to communicate with each monitoring debugger in response to determining that the sensor application has stopped execution.

20. The system of claim 19, wherein the memory contains further instructions which when executed by the processing circuitry further configure the system to:

configure the monitoring debugger to stop execution of the sensor application, wherein the sensor application is deployed through a monitoring debugger.

21. The system of claim 13, wherein the memory contains further instructions which when executed by the processing circuitry further configure the system to:

send a rule to the sensor application, the rule including a logical expression and an action;

configure the sensor application to apply the rule on a detected event; and configure the sensor application to perform the action in response to applying the rule on the event and receiving a predetermined result.

* * * * *